(12) United States Patent
Long et al.

(10) Patent No.: US 11,875,174 B2
(45) Date of Patent: Jan. 16, 2024

(54) METHOD AND APPARATUS FOR VIRTUAL MACHINE EMULATOR UPGRADING VIRTUALIZATION EMULATOR

(71) Applicant: Huawei Technologies Co., Ltd., Shenzhen (CN)

(72) Inventors: Peng Long, Hangzhou (CN); Jing Wang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 570 days.

(21) Appl. No.: 17/118,237

(22) Filed: Dec. 10, 2020

(65) Prior Publication Data

US 2021/0089345 A1   Mar. 25, 2021

Related U.S. Application Data

(63) Continuation of application No. PCT/CN2019/106592, filed on Sep. 19, 2019.

(30) Foreign Application Priority Data

Sep. 30, 2018 (CN) .......................... 201811162722.1

(51) Int. Cl.
*G06F 9/455* (2018.01)
*G06F 9/50* (2006.01)
*G06F 12/1009* (2016.01)

(52) U.S. Cl.
CPC ........ *G06F 9/45558* (2013.01); *G06F 9/5016* (2013.01); *G06F 9/5077* (2013.01); *G06F 12/1009* (2013.01); *G06F 2009/45562* (2013.01); *G06F 2009/45583* (2013.01); *G06F 2009/45591* (2013.01)

(58) Field of Classification Search
CPC .. G06F 9/45558; G06F 9/5016; G06F 9/5077; G06F 12/1009; G06F 2009/45562; G06F 2009/45583; G06F 2009/45591; G06F 8/656; G06F 9/4418; G06F 11/1433; G06F 2009/4557; G06F 2009/45575; G06F 2009/45579; G06F 8/65
See application file for complete search history.

(56) References Cited

U.S. PATENT DOCUMENTS

| 9,292,332 | B1 | 3/2016 | Liguori et al. |
| 2011/0185352 | A1 | 7/2011 | Costa |
| 2013/0024862 | A1 | 1/2013 | Lim et al. |

(Continued)

FOREIGN PATENT DOCUMENTS

| CN | 107643937 | * | 7/2016 |
| CN | 106201566 A | | 12/2016 |

(Continued)

*Primary Examiner* — Sisley N Kim
(74) *Attorney, Agent, or Firm* — Conley Rose, P.C.

(57) ABSTRACT

A method includes starting a second virtual machine using a first virtualization emulator of a later version when a first virtual machine is running based on a second virtualization emulator of an earlier version, where the second virtual machine has a same configuration as the first virtual machine, suspending the first virtual machine and the second virtual machine, sending device status information of the first virtual machine to the second virtual machine, and controlling the second virtual machine to resume running based on the device status information.

20 Claims, 11 Drawing Sheets

(56) References Cited

U.S. PATENT DOCUMENTS

| | | |
|---|---|---|
| 2016/0210141 A1 | 7/2016 | Gunti et al. |
| 2018/0074842 A1 | 3/2018 | Fu et al. |
| 2018/0081674 A1 | 3/2018 | Zhang et al. |
| 2018/0095899 A1* | 4/2018 | Durham .............. G06F 12/1408 |
| 2018/0136961 A1 | 5/2018 | Liguori et al. |

FOREIGN PATENT DOCUMENTS

| | | |
|---|---|---|
| CN | 106293781 A | 1/2017 |
| CN | 106293846 A | 1/2017 |
| CN | 106301876 A | 1/2017 |
| CN | 106371895 A | 2/2017 |
| CN | 106502763 A | 3/2017 |
| CN | 107643937 A | 1/2018 |
| WO | 2016184320 A1 | 11/2016 |

* cited by examiner

CONT.
FROM
FIG. 6A

```
A memory sharing back-end agent in the virtual machine monitor generates, in          S606
response to a request for sharing the virtual memory area between the second
virtual machine and the first virtual machine, an entry corresponding to the
virtual memory area in a process page table of the second virtual machine by
using an entry corresponding to the virtual memory area in a process page table
of the first virtual machine
```

The memory sharing back-end agent establishes reverse mapping information for   S607
the virtual memory area of the second virtual machine based on the process page
table of the second virtual machine The virtual machine monitor sends device status information of the first virtual   S608
machine to the second virtual machine The virtual machine monitor controls the second virtual machine to resume   S609
running based on the device status information of the first virtual machine

FIG. 6B

METHOD AND APPARATUS FOR VIRTUAL MACHINE EMULATOR UPGRADING VIRTUALIZATION EMULATOR

CROSS-REFERENCE TO RELATED APPLICATIONS

This application is a continuation of International Patent Application No. PCT/CN2019/106592 filed on Sep. 19, 2019, which claims priority to Chinese Patent Application No. 201811162722.1 filed on Sep. 30, 2018. The disclosures of the aforementioned applications are hereby incorporated by reference in their entireties.

TECHNICAL FIELD

This application relates to the virtualization field, and in particular, to a method and an apparatus for upgrading a virtualization emulator.

BACKGROUND

In a Kernel-based Virtual Machine (KVM) technology, a virtual machine instance that can independently run an operating system can be emulated using a virtualization emulator such as a Quick EMUlator (QEMU). Further, on a physical host, one virtual machine instance corresponds to one virtualization emulator process. The virtualization emulator process may apply, on the physical host, for a memory used by the virtual machine, and emulate a virtual device such as a network adapter, a disk, a serial port, and an input device for the virtual machine.

For a virtual machine instance that has already run online, to enhance security, repair vulnerabilities, and optimize source code-level performance, it is inevitable to partially or integrally upgrade a component of a virtual machine. To be specific, a virtual machine running based on a virtualization emulator process of an earlier version needs to be upgraded to a virtual machine running based on a virtualization emulator process of a later version. To prevent a service of the virtual machine from being affected, the virtualization emulator may be upgraded online without shutting down the virtual machine. However, upgrading often fails when the virtualization emulator is upgraded online. In this case, a virtual machine running based on a virtualization emulator of the later version cannot run normally, and the virtual machine running based on the virtualization emulator process of the later version cannot roll back to a virtual machine running based on a virtualization emulator of the earlier version. Consequently, the virtual machine stops running, and the service of the virtual machine is forced to be interrupted.

SUMMARY

A technical problem to be resolved in embodiments of this application is to provide a method and an apparatus for upgrading a virtualization emulator such that when the virtualization emulator fails to be upgraded online, a virtual machine running based on a virtualization emulator process of a later version can roll back to a virtual machine running based on a virtualization emulator of an earlier version, thereby avoiding a case in which the virtual machine stops running and a service of the virtual machine is forced to be interrupted due to an upgrade failure.

According to a first aspect, an embodiment of this application provides a method for upgrading a virtualization emulator, including, when a first virtual machine is running based on a virtualization emulator of an earlier version, starting a second virtual machine using a virtualization emulator of a later version, where the second virtual machine has same configuration information as the first virtual machine, suspending the first virtual machine and the second virtual machine, sending device status information of the first virtual machine to the second virtual machine, and controlling the second virtual machine to resume running based on the device status information.

If the second virtual machine can resume running, it indicates that warm upgrade succeeds this time, and an interrupted virtual machine service on the first virtual machine may continue to run on the second virtual machine, but if the second virtual machine cannot normally resume running, it indicates that the warm upgrade fails this time, and although the interrupted virtual machine service cannot continue to run on the second virtual machine, because the first virtual machine can still resume running based on the virtualization emulator of the earlier version, the interrupted virtual machine service may resume running on the first virtual machine. This means that when the warm upgrade fails, a virtual machine that runs the same virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted and cannot resume running due to an upgrade failure.

With reference to the first aspect, in a first possible implementation of the first aspect, the method further includes sending target resource information of a virtual device of the first virtual machine from the first virtual machine to the second virtual machine, and in response to an instruction of creating a first virtual device for the second virtual machine, searching the target resource information for resource information of the first virtual device, and using the found resource information as the resource information of the first virtual device.

In this implementation, the second virtual machine may further obtain the target resource information of the virtual device of the first virtual machine. In this way, when creating a virtual device, the second virtual machine may directly use resource information in the target resource information, and does not need to create the resource information, thereby reducing extra resource consumption in a warm upgrade process.

With reference to the first possible implementation of the first aspect, in a second possible implementation of the first aspect, the method further includes, in response to an instruction of creating a second virtual device for the second virtual machine, searching the target resource information for resource information of the second virtual device, and if the resource information of the second virtual device cannot be found, creating the resource information of the second virtual device for the second virtual device.

In this implementation, if the resource information of the second virtual device cannot be found, to ensure that the second virtual machine can have the resource information of the second virtual device, the resource information of the second virtual device may be created for the second virtual machine.

With reference to the first aspect, in a third possible implementation of the first aspect, the method further includes creating a virtual memory area of the second virtual machine based on identification information of a virtual memory area of the first virtual machine, where the virtual memory area of the second virtual machine is the virtual memory area of the first virtual machine.

In this implementation, a corresponding virtual memory area is created for the second virtual machine based on the identification information of the virtual memory area of the first virtual machine such that the first virtual machine and the second virtual machine may share a same virtual memory area, and there is no need to create a new virtual memory area for the second virtual machine, thereby reducing overheads in the warm upgrade process.

With reference to the third possible implementation of the first aspect, in a fourth possible implementation of the first aspect, the method further includes, in response to a request for sharing a virtual memory area between the second virtual machine and the first virtual machine, generating an entry corresponding to the virtual memory area in a process page table of the second virtual machine using an entry corresponding to the virtual memory area in a process page table of the first virtual machine, and establishing reverse mapping information for the virtual memory area of the second virtual machine based on the process page table of the second virtual machine.

In this implementation, the virtual memory area of the first virtual machine may be shared with the second virtual machine within 20 microseconds. In addition, by increasing a reference technology of a related process page table, even if the warm upgrade fails because the second virtual machine cannot successfully resume running or because of another reason, the process page table of the first virtual machine is not released, and the first virtual machine can still normally resume running such that the interrupted virtual machine service on the first virtual machine can continue to run.

With reference to the fourth possible implementation of the first aspect, in a fifth possible implementation of the first aspect, the generating an entry corresponding to the virtual memory area in a process page table of the second virtual machine using an entry corresponding to the virtual memory area in a process page table of the first virtual machine includes copying an entry corresponding to the virtual memory area in a page global directory (PGD) page table of the first virtual machine to an entry corresponding to the virtual memory area in a PGD page table of the second virtual machine, and increasing, by 1, a reference count of a lower-level page table to which the entry corresponding to the virtual memory area in the PGD page table of the second virtual machine points.

In this implementation, the reference count of the lower-level page table to which the entry corresponding to the virtual memory area in the PGD page table of the second virtual machine points is increased by 1. In this way, when the first virtual machine is shut down, a page upper directory (PUD) page table, a page middle directory (PMD) page table, and a page offset (PT) page table in the process page table of the first virtual machine are not released such that a logical address of the second virtual machine may be mapped to a physical address corresponding to the virtual memory area of the first virtual machine, that is, the second virtual machine may access a memory resource in the virtual memory area of the first virtual machine such that the second virtual machine can share the virtual memory area of the first virtual machine.

With reference to any one of the third to the fifth possible implementations of the first aspect, in a sixth possible implementation of the first aspect, the identification information includes a start address and a size that are of the virtual memory area.

With reference to the sixth possible implementation of the first aspect, in a seventh possible implementation of the first aspect, the method further includes obtaining an Extended Page Tables (EPT) base address of the first virtual machine, and setting an EPT base address of the second virtual machine based on the EPT base address of the first virtual machine.

In this implementation, the EPT page table base address of the first virtual machine is set to the EPT page table base address of the second virtual machine such that an EPT page table of the first virtual machine can be shared with the second virtual machine. In this way, after warm upgrade is performed on the virtualization emulator, an EPT page table does not need to be recreated for the second virtual machine such that an EPT violation exception caused by creation of the EPT page table can be avoided, thereby ensuring that memory access performance of the second virtual machine does not deteriorate within a period of time after the warm upgrade, and reducing virtual machine service performance fluctuation caused by the warm upgrade.

In some possible implementations, suspending the first virtual machine and the second virtual machine may include suspending the first virtual machine and the second virtual machine after initialization setting of the second virtual machine is completed.

In some possible implementations, when the second virtual machine is controlled to resume running based on the device status information, the first virtual machine may be further shut down.

According to a second aspect, an embodiment of this application provides an apparatus for upgrading a virtualization emulator, and the apparatus includes an installation unit configured to, when a first virtual machine is running based on a virtualization emulator of an earlier version, install a virtualization emulator of a later version, a starting unit configured to start a second virtual machine using the virtualization emulator of the later version, where the second virtual machine has same configuration information as the first virtual machine, a suspension unit configured to suspend the first virtual machine and the second virtual machine, a first sending unit configured to send device status information of the first virtual machine to the second virtual machine, and a control unit configured to control the second virtual machine to resume running based on the device status information.

With reference to the second aspect, in a first possible implementation of the second aspect, the apparatus further includes a second sending unit configured to send target resource information of a virtual device of the first virtual machine from the first virtual machine to the second virtual machine, and a first searching unit configured to, in response to an instruction of creating a first virtual device for the second virtual machine, search the target resource information for resource information of the first virtual device, and use the found resource information as the resource information of the first virtual device.

With reference to the first possible implementation of the second aspect, in a second possible implementation of the second aspect, the apparatus further includes a second searching unit configured to, in response to an instruction of creating a second virtual device for the second virtual machine, search the target resource information for resource information of the second virtual device, and a first creation unit configured to create the resource information for the second virtual device if the resource information cannot be found.

With reference to the second aspect, in a third possible implementation of the second aspect, the apparatus further includes a second creation unit configured to create a virtual memory area of the second virtual machine based on identification information of a virtual memory area of the first virtual machine, where the virtual memory area of the second virtual machine is the virtual memory area of the first virtual machine.

With reference to the third possible implementation of the second aspect, in a fourth possible implementation of the second aspect, the apparatus further includes a generation unit configured to, in response to a request for sharing a virtual memory area between the second virtual machine and the first virtual machine, generate an entry corresponding to the virtual memory area in a process page table of the second virtual machine using an entry corresponding to the virtual memory area in a process page table of the first virtual machine, and an establishment unit configured to establish reverse mapping information for the virtual memory area of the second virtual machine based on the process page table of the second virtual machine.

With reference to the fourth possible implementation of the second aspect, in a fifth possible implementation of the second aspect, the generation unit includes a copying subunit configured to copy an entry corresponding to the virtual memory area in a PGD page table of the first virtual machine to an entry corresponding to the virtual memory area in a PGD page table of the second virtual machine, and a value increasing subunit configured to increase, by 1, a reference count of a lower-level page table to which the entry corresponding to the virtual memory area in the PGD page table of the second virtual machine points.

With reference to any one of the third to the fifth possible implementations of the second aspect, in a sixth possible implementation of the second aspect, the identification information includes a start address and a size that are of the virtual memory area.

With reference to the sixth possible implementation of the second aspect, in a seventh possible implementation of the second aspect, the apparatus further includes an obtaining unit configured to obtain an EPT base address of the first virtual machine, and a setting unit configured to set an EPT base address of the second virtual machine based on the EPT base address of the first virtual machine.

The apparatus for upgrading a virtualization emulator provided in the second aspect corresponds to the method for upgrading a virtualization emulator provided in the first aspect. Therefore, for various possible implementations of the apparatus for upgrading a virtualization emulator provided in the second aspect, refer to various possible implementations of the method for upgrading a virtualization emulator provided in the first aspect.

According to a third aspect, an embodiment of this application provides a computer-readable storage medium, the computer-readable storage medium stores an instruction, and when the instruction is run on a computer or a processor, the computer or the processor is enabled to perform the method in any possible design in the first aspect.

According to a fourth aspect, an embodiment of this application provides a computer program product including an instruction, and when the instruction is run on a computer or a processor, the computer or the processor is enabled to perform the method in any possible design in the first aspect.

In the embodiments of this application, when the first virtual machine is running based on the virtualization emulator of the earlier version, that is, when the warm upgrade needs to be performed on the virtualization emulator, the virtualization emulator of the later version may be installed, and the second virtual machine is started using the virtualization emulator of the later version, where the second virtual machine has a same configuration as the first virtual machine, then, the first virtual machine and the second virtual machine may be suspended, and the device status information of the first virtual machine is sent to the second virtual machine, to control the second virtual machine to resume running based on the device status information of the first virtual machine. It can be learned that the first virtual machine and the second virtual machine have the same configuration and the same device status information. Therefore, a virtual machine service running on the first virtual machine may also run on the second virtual machine. If the second virtual machine can resume running after being suspended, it indicates that the warm upgrade succeeds this time, and the interrupted virtual machine service on the first virtual machine may continue to run on the second virtual machine, but if the second virtual machine fails to resume running, it indicates that the warm upgrade fails this time, and although the interrupted virtual machine service cannot continue to run on the second virtual machine, because the first virtual machine still resumes running based on the virtualization emulator of the earlier version, the interrupted virtual machine service may resume running on the first virtual machine. This means that when the warm upgrade fails, a virtual machine that runs the same virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted and cannot resume running due to an upgrade failure.

BRIEF DESCRIPTION OF DRAWINGS

To describe the technical solutions in the embodiments of this application more clearly, the following briefly describes the accompanying drawings for describing some of the embodiments. The accompanying drawings in the following description show merely some embodiments of this application, and an ordinary person skilled in the art may derive other drawings from these accompanying drawings.

FIG. 6A and FIG. 6B are a schematic flowchart of still another method for upgrading a virtual machine emulator according to an embodiment of this application;

DESCRIPTION OF EMBODIMENTS

Figure 1:
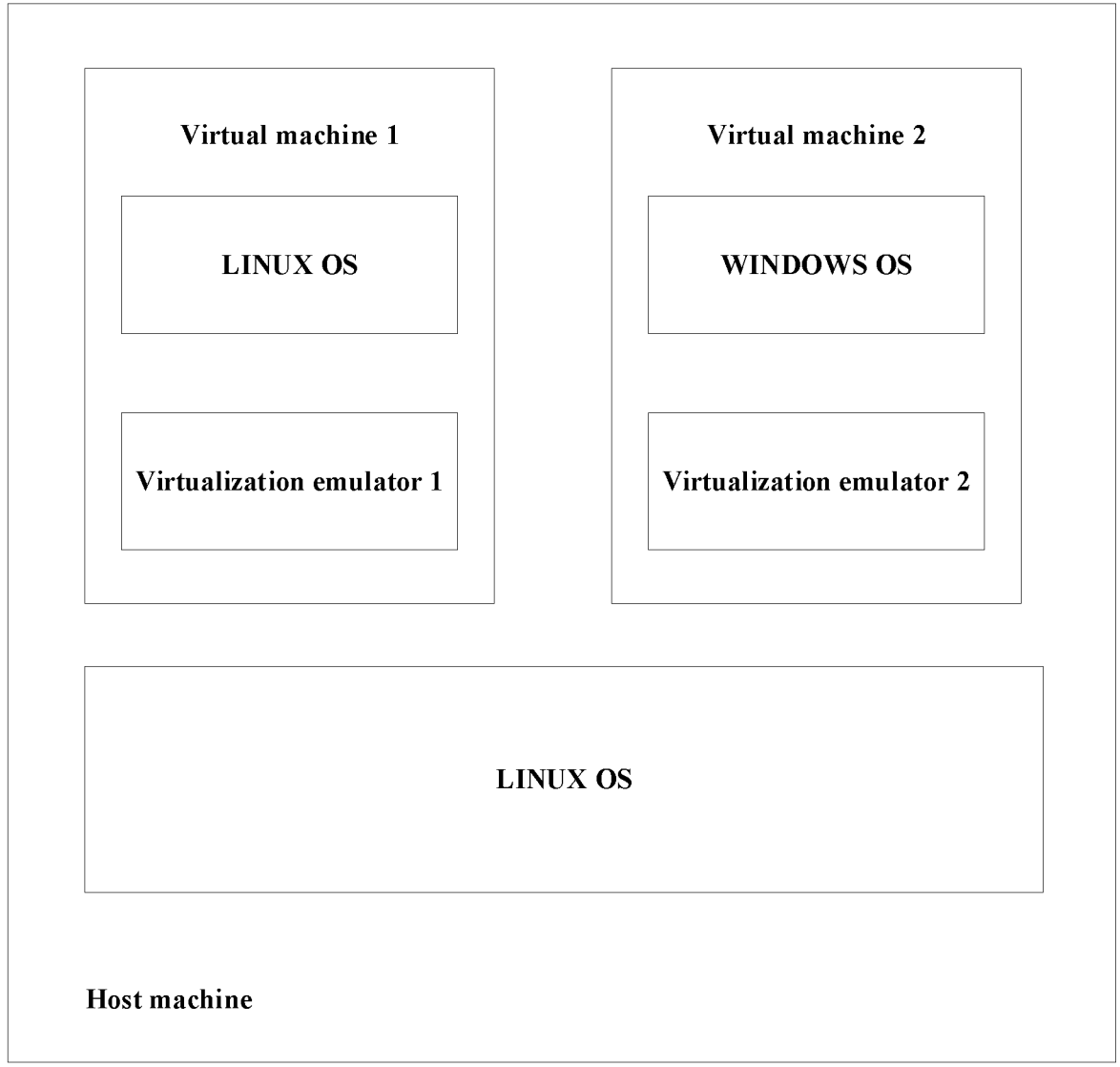
FIG. 1 is a schematic diagram of an example application scenario according to an embodiment of this application.

Warm upgrade is partial or integral online upgrade of a component of a virtual machine without shutting down a virtual machine instance, and is also a secure, efficient, and cost-effective method for upgrading virtualization emulators in a large scale in a public cloud cluster. When a virtualization emulator of the virtual machine needs to be upgraded, a virtual machine running based on a virtualization emulator of an earlier version is usually suspended first, and a virtual machine service running on the virtual machine is also suspended. Then, the virtualization emulator on the virtual machine is upgraded from the earlier version to a later version. After the upgrade is completed, the virtual machine service resumes running on the virtual machine. In this case, the virtual machine runs based on the virtualization emulator of the later version. However, during warm upgrade, it is inevitable that the virtual machine emulator fails to be upgraded. If the upgrade fails, because the virtualization emulator on the virtual machine has been upgraded from the earlier version to the later version, and the virtual machine running based on the virtualization emulator of the later version cannot run normally, the virtual machine running based on the virtualization emulator of the later version cannot roll back to the virtual machine running based on the virtualization emulator of the earlier version. Consequently, it is likely that the virtual machine may stop running, and the virtual machine service is forced to be interrupted and cannot resume running.

Based on this, an embodiment of this application provides a method for upgrading a virtualization emulator. On a basis that a first virtual machine runs based on a virtualization emulator of an earlier version, a second virtual machine running based on an emulator of a later version is created, and the second virtual machine and the first virtual machine have a same configuration and same device status information. In this way, after the second virtual machine successfully runs, an interrupted virtual machine service on the first virtual machine may resume running on the second virtual machine, to upgrade the virtualization emulator. In addition, even if warm upgrade fails, although the interrupted virtual machine service cannot continue to run on the second virtual machine, because the first virtual machine can still resume running based on the virtualization emulator of the earlier version, the interrupted virtual machine service may resume running on the first virtual machine. This means that when the warm upgrade fails, a virtual machine that runs the same virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted and cannot resume running due to an upgrade failure.

For example, one of scenarios in this embodiment of this application may be applied to an example scenario shown in FIG. 1. In this scenario, a KVM host machine (that is, a physical machine) based on a LINUX system may include two virtual machines: a virtual machine 1 based on a LINUX client operating system and a virtual machine 2 based on a WINDOWS client operating system. The KVM host machine uses an x86 with virtualization extension architecture and emulates hardware behavior using a virtualization emulator module such that the virtual machine 1 and the virtual machine 2 can run normally in an environment emulated by the virtualization emulator.

Before warm upgrade is performed on a virtualization emulator of an earlier version installed on the virtual machine 1, a virtual machine service runs on the virtual machine 1. When the warm upgrade needs to be performed on the virtualization emulator on the virtual machine 1, a virtual machine monitor on the KVM host machine may install a virtualization emulator of a later version on the KVM host machine, and then, the virtual machine monitor may start the second virtual machine using the virtualization emulator of the later version, where the started second virtual machine has same configuration information as the first virtual machine. Then, the virtual machine monitor may suspend the virtual machine 1 and the second virtual machine. In this case, the virtual machine service on the virtual machine 1 is also in an interrupted state. Then, the virtual machine monitor may send device status information of the virtual machine 1 to the second virtual machine, and control the second virtual machine to resume running based on the device-related device. Because the second virtual machine resumes running based on the device status information of the virtual machine 1, the virtual machine service originally running on the virtual machine 1 may resume running on the second virtual machine. In addition, even if the warm upgrade fails, after the virtual machine 1 resumes running, the previously interrupted virtual machine service may also resume running on the virtual machine 1 such that a virtual machine running the virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted due to an upgrade failure.

It may be understood that the foregoing scenario is merely an example of a scenario provided in this embodiment of this application, and this embodiment of this application is not limited to this scenario. For example, the host machine may include more than two virtual machines, and all virtual machines on the host machine have a same operating system.

To make a person skilled in the art understand the technical solutions in this application better, the following clearly and completely describes the technical solutions in the embodiments of this application with reference to the accompanying drawings in the embodiments of this application. The described embodiments are merely a part rather than all of the embodiments of this application. All other embodiments obtained by a person of ordinary skill in the art based on the embodiments of this application without creative efforts shall fall within the protection scope of this application.

Figure 2:
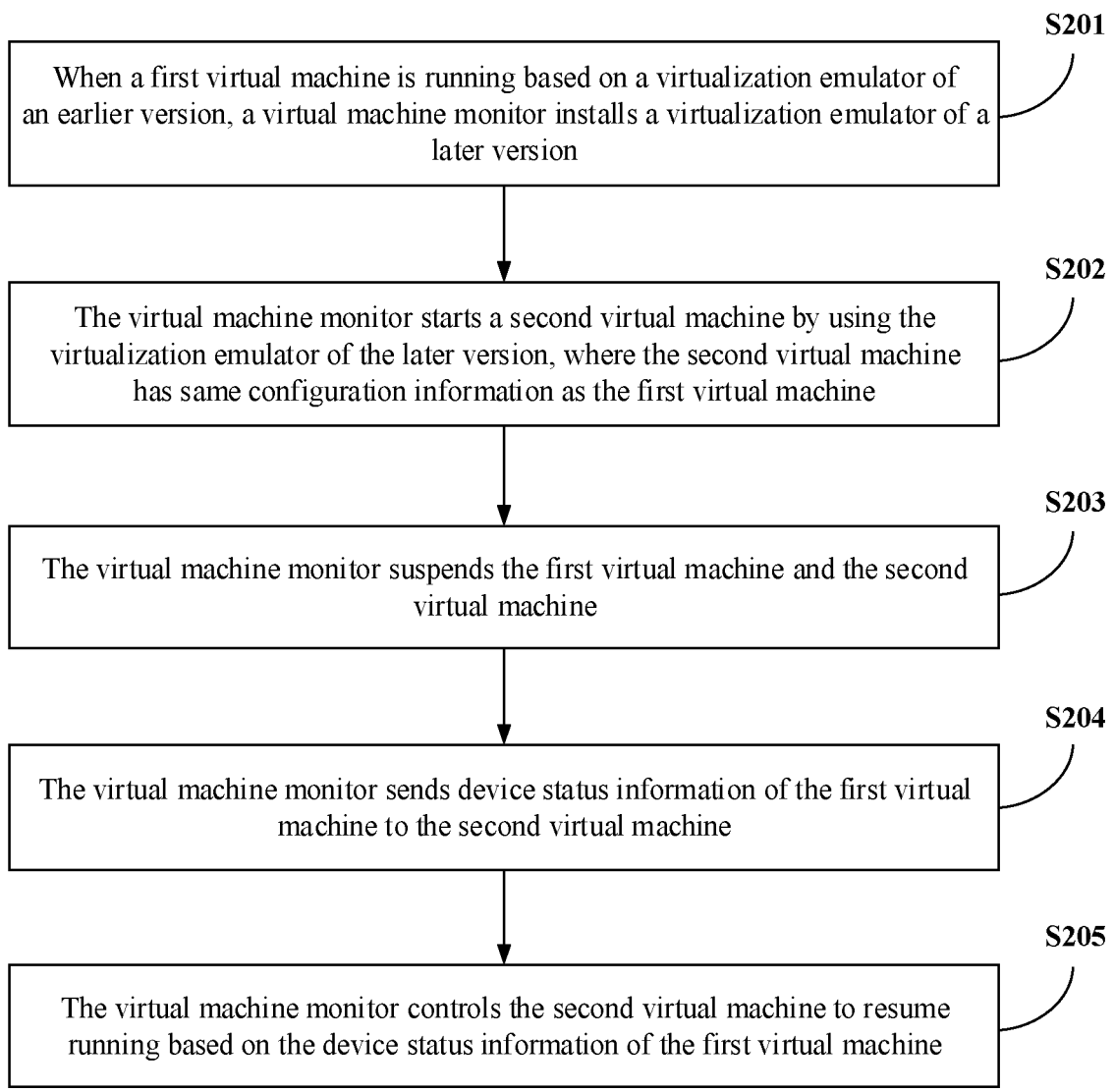
FIG. 2 is a schematic flowchart of a method for upgrading a virtualization emulator according to an embodiment of this application.

FIG. 2 is a schematic flowchart of a method for upgrading a virtualization emulator according to an embodiment of this application. The method may include the following steps.

S201: When a first virtual machine is running based on a virtualization emulator of an earlier version, a virtual machine monitor installs a virtualization emulator of a later version.

In this embodiment, to avoid affecting a virtual machine service currently running on the first virtual machine, a virtual machine emulator on a host machine on which the first virtual machine is located may be upgraded in a warm upgrade manner, and further, a virtual machine monitor on the host machine may control upgrade of the virtual machine emulator. When the first virtual machine is running based on the virtualization emulator of the earlier version, the virtual machine monitor may install the virtualization emulator of the later version in a system of the host machine. In this way, when the virtual machine service runs on the first virtual machine, the virtual machine service may not be affected by installation of the virtualization emulator of the later version, and the first virtual machine may install the virtualization emulator of the later version without a need to suspend the virtual machine service such that interruption time of the virtual machine service in a warm upgrade process can be reduced. In some scenarios, the virtual machine monitor may install the virtualization emulator of the later version based on a QEMU binary package.

S202: The virtual machine monitor starts a second virtual machine using the virtualization emulator of the later version, where the second virtual machine has same configuration information as the first virtual machine.

In an example implementation, after the virtualization emulator of the later version is successfully installed, the virtual machine monitor starts the second virtual machine using the virtualization emulator of the later version. In addition, the virtual machine monitor may obtain configuration information of the first virtual machine, and perform corresponding configuration for the second virtual machine based on the configuration information such that the first virtual machine and the second virtual machine may have a same configuration. In this way, it is ensured that a virtual machine service that runs on the first virtual machine can also run on the second virtual machine such that after the warm upgrade, an interrupted virtual machine service can resume running on the second virtual machine.

The configuration information of the first virtual machine may include information such as an identity (ID) of the first virtual machine, a name of the first virtual machine, and a virtual device of the first virtual machine.

Generally, the first virtual machine and the second virtual machine have the same configuration. In this case, the first virtual machine and the second virtual machine may use a same virtual device resource such as a TAP (e.g., network tap) device, a PTY (pseudo-tty or a virtual terminal) device, a virtual network computing (VNC) port, a disk device, and a serial port device on the host machine.

It should be noted that these virtual device resources may be shared by the first virtual machine and the second virtual machine, but are not simultaneously used by the first virtual machine and the second virtual machine. Further, in this embodiment, before the first virtual machine is suspended, these virtual device resources are used by the first virtual machine, and for the second virtual machine in a started state or an initialization setting state, these virtual device resources are not used. After the first virtual machine is suspended, the first virtual machine usually does not use these virtual device resources anymore. Therefore, the first virtual machine and the second virtual machine usually do not simultaneously use these virtual device resources.

It should be noted that, because both the first virtual machine and the second virtual machine may use a same virtual device resource, in a warm upgrade process, the virtual machine monitor does not need to create these virtual devices for the second virtual machine again such that overheads caused by creation of these additional virtual device resources in the warm upgrade process can be avoided.

After the virtual machine monitor performs corresponding configuration for the second virtual machine based on the configuration information of the first virtual machine, the second virtual machine may perform initialization setting based on a virtual device that can be used.

S203: The virtual machine monitor suspends the first virtual machine and the second virtual machine.

In an example implementation, the virtual machine monitor may suspend the first virtual machine and the second virtual machine after the initialization setting of the second virtual machine is completed. In this case, the virtual machine service running on the first virtual machine is interrupted because of suspension of the first virtual machine. A sequence of suspending the first virtual machine and the second virtual machine is not limited herein.

It should be noted that, in the foregoing implementation, the virtual machine service on the first virtual machine is interrupted only after the virtual machine monitor successfully installs the virtualization emulator of the later version, the second virtual machine is configured, and the initialization setting of the second virtual machine is completed, and the virtual machine service on the first virtual machine is not interrupted before the virtualization emulator starts to be upgraded. In such a warm upgrade manner, when the virtualization emulator of the later version is being installed and configuration and initialization setting are being performed on the second virtual machine, the virtual machine service is always in a running state, thereby reducing interruption time of the virtual machine service, and further reducing impact of the warm upgrade on the virtual machine service.

Certainly, in actual application, before the initialization setting of the second virtual machine is completed, the virtual machine monitor may first suspend the first virtual machine, and then, the virtual machine monitor suspends the second virtual machine after determining that the initialization setting of the second virtual machine is completed.

S204: The virtual machine monitor sends device status information of the first virtual machine to the second virtual machine.

The device status information of the first virtual machine is running status information of a virtual device that is on the first virtual machine and that is related to a suspended service when the first virtual machine is suspended. For example, when the first virtual machine is suspended, the first virtual machine is using a serial port device and a disk device to complete a data storage service. In this case, the device status information of the first virtual machine may indicate that the first virtual machine is using the serial port device and the disk device at a suspension moment, and is not using another device such as a VNC port or a TAP device. For example, the device status information of the first virtual machine may be a specific value in a register that is on a related virtual device and that is associated with processing of the suspended service.

It should be noted that when the virtual machine service is running, a corresponding virtual device usually needs to be used to meet a running requirement. In this way, the device status information of the first virtual machine can reflect a running status of the virtual machine service running on the first virtual machine. For example, for a virtual machine service of data storage, the first virtual machine usually needs to use a corresponding virtual disk device to store data. In a storage process, the disk device is always in a use state. When the data storage service is suspended, the device status information may not only indicate that the first virtual machine is executing the virtual machine service at the suspension moment, but also represent a storage progress of the data storage service.

In some possible implementations, the device status information of the first virtual machine may be sent to the second virtual machine using a UNIX socket shared channel.

S205: The virtual machine monitor controls the second virtual machine to resume running based on the device status information of the first virtual machine.

It may be understood that the previously interrupted virtual machine service runs on the first virtual machine. To enable the previously interrupted virtual machine service to continue to run on the second virtual machine, the second virtual machine may be controlled to resume running based on the device status information of the first virtual machine. In this way, after resuming running, the second virtual machine can continue, based on the device status information, to run the virtual machine service from a point at which the virtual machine is interrupted.

In a further implementation, if the second virtual machine can resume running and run normally, it indicates that the virtualization emulator is successfully upgraded this time, and a virtual machine on which the virtual machine service is running changes from the first virtual machine running based on the virtualization emulator of the earlier version to the second virtual machine running based on the virtualization emulator of the later version, and the interrupted virtual machine service may resume running on the second virtual machine. In this case, the first virtual machine does not need to keep in a suspended state, and the first virtual machine may be shut down. If the second virtual machine cannot resume running or fails to run, it indicates that the virtualization emulator fails to be upgraded this time, but the first virtual machine can continue to run based on the virtualization emulator of the earlier version, and therefore, the interrupted virtual machine service may still resume running on the first virtual machine, to be specific, a virtual machine that runs the virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted and cannot resume running due to an upgrade failure. In this case, the second virtual machine may be shut down and the upgrade of the virtualization emulator on the host machine this time may be ended, or the second virtual machine may be restarted and configured, to attempt to upgrade the virtualization emulator on the host machine again.

In this embodiment, if the second virtual machine can resume running, it indicates that warm upgrade succeeds this time, and the interrupted virtual machine service on the first virtual machine may continue to run on the second virtual machine, if the second virtual machine cannot normally resume running, it indicates that the warm upgrade fails this time, and although the interrupted virtual machine service cannot continue to run on the second virtual machine, because the first virtual machine still resumes running based on the virtualization emulator of the earlier version, the interrupted virtual machine service may resume running on the first virtual machine. This means that when the warm upgrade fails, a virtual machine that runs the same virtual machine service may roll back from a virtual machine running based on the virtualization emulator of the later version to a virtual machine running based on the virtualization emulator of the earlier version, thereby avoiding a problem that the virtual machine stops running and a service of the virtual machine is forced to be interrupted and cannot resume running due to an upgrade failure.

Figure 3:
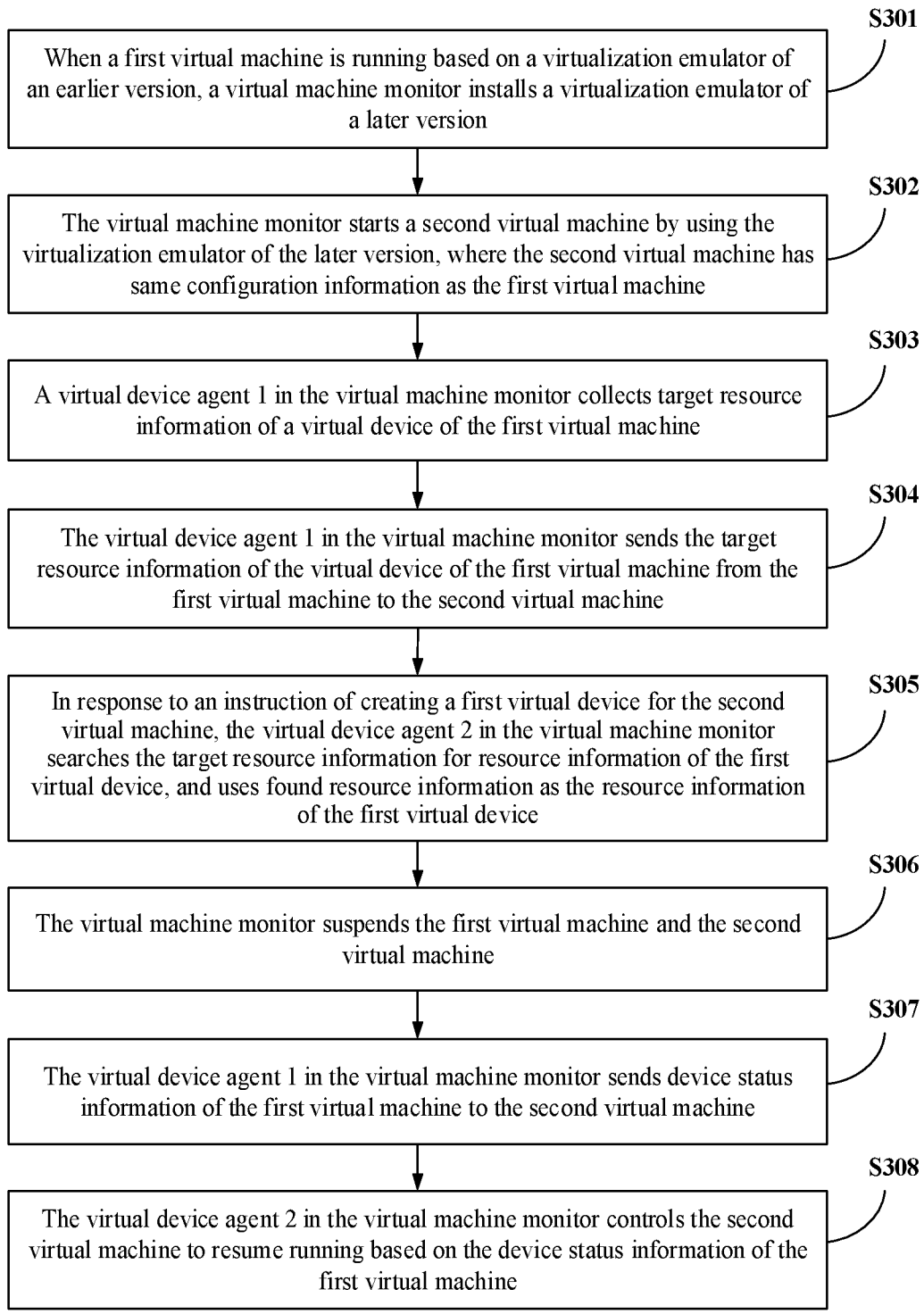
FIG. 3 is a schematic flowchart of another method for upgrading a virtual machine emulator according to an embodiment of this application.

In actual application, one virtual machine instance corresponds to one virtualization emulator process. In a QEMU virtual machine, a plurality of virtual device resources are managed and accessed in a process file handle manner. For example, in a virtual machine based on a LINUX system, a file handle table is configured for a virtualization emulator process, to record resource information such as a file handle resource owned by the process. Therefore, in the warm upgrade process, resource information of a virtual device of the first virtual machine may be further sent to the second virtual machine such that the second virtual machine performs initialization setting. Further, FIG. 3 is a schematic flowchart of another method for upgrading a virtualization emulator according to an embodiment of this application. Different from the previous embodiment, in this embodiment, to facilitate initialization setting of a second virtual machine, in a warm upgrade process, resource information of a virtual device of a first virtual machine is further sent to the second virtual machine. The method may include the following steps.

S301: When a first virtual machine is running based on a virtualization emulator of an earlier version, a virtual machine monitor installs a virtualization emulator of a later version.

In this embodiment, similarly, a virtualization emulator on a host machine is upgraded online without shutting down a first virtual machine example. In some possible implementations, a binary package of the virtualization emulator of the later version may be installed in a system of the host machine.

S302: The virtual machine monitor starts a second virtual machine using the virtualization emulator of the later version, where the second virtual machine has same configuration information as the first virtual machine.

In actual application, the virtual machine monitor on the host machine may start the second virtual machine using an installed virtual machine of the later version, and send the configuration information of the first virtual machine to the second virtual machine, to perform corresponding configuration on the second virtual machine based on the configuration information such that the second virtual machine and the first virtual machine have a same configuration. In this way, it can be ensured that a virtual machine service running on the first virtual machine can also run on the second virtual machine.

S303: A virtual device agent 1 in the virtual machine monitor collects target resource information of a virtual device of the first virtual machine.

In some examples, the collected target resource information of the virtual device may include an identifier of the virtual device (such as a name of the virtual device) of the first virtual machine and a file handle corresponding to the identifier of the virtual device of the first virtual machine. The virtual device may include but is not limited to a TAP device, a PTY device, a VNC port, a disk device, a serial port device, and the like.

Figure 4:
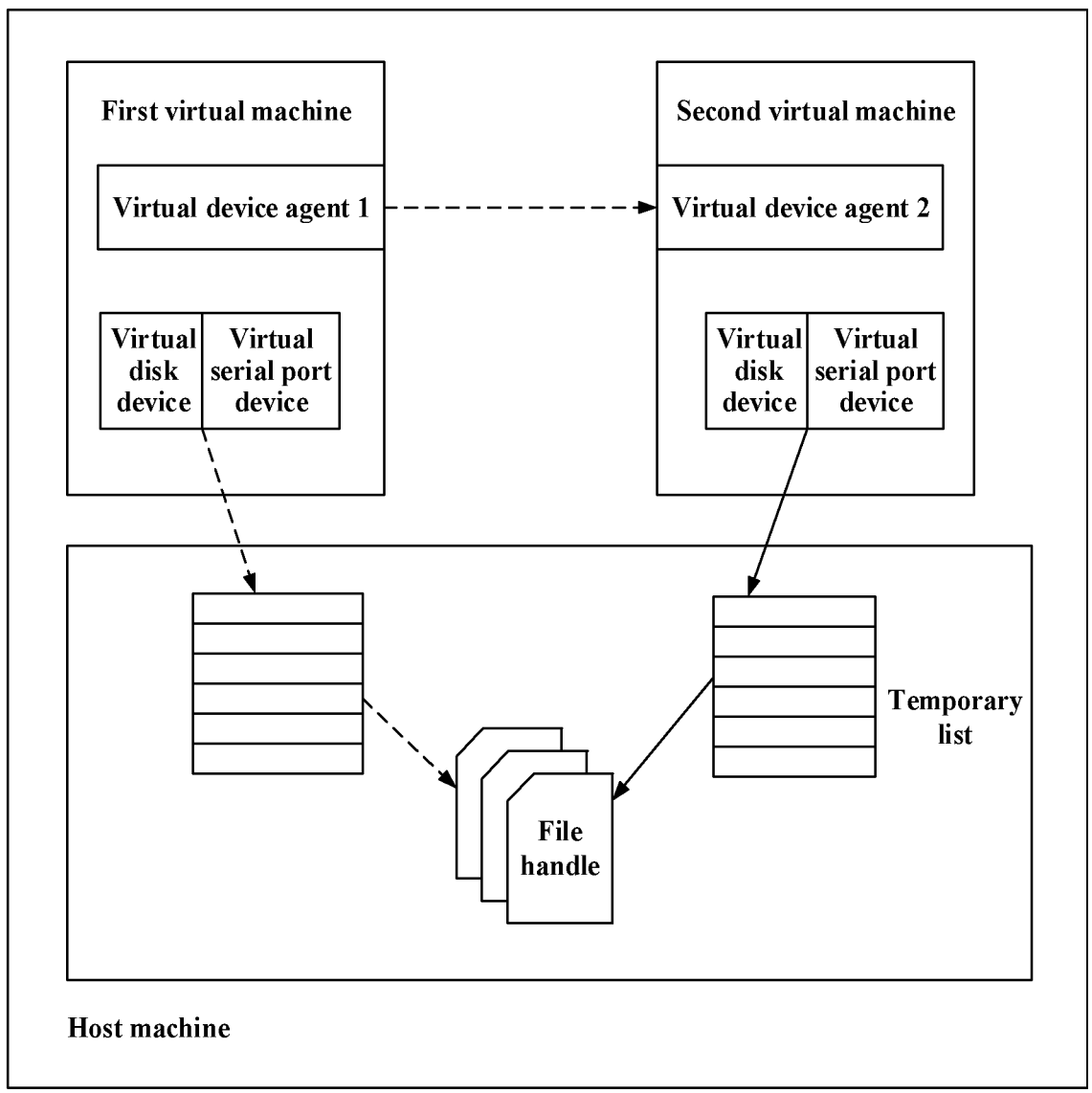
FIG. 4 is an architectural diagram of an example application scenario according to an embodiment of this application.

In an example implementation, after the second virtual machine is started, a virtual device agent 2 in the virtual machine monitor may send a request for obtaining a virtual device resource of the first virtual machine to the virtual device agent 1, and the virtual device agent 1 responds to the received request, and collects the target resource information of the virtual device of the first virtual machine. The virtual machine monitor may include the virtual device agent 1 and the virtual device agent 2. The virtual device agent 1 is located on the first virtual machine, and the virtual device agent 2 is located on the second virtual machine, as shown in FIG. 4.

S304: The virtual device agent 1 in the virtual machine monitor sends the target resource information of the virtual device of the first virtual machine from the first virtual machine to the second virtual machine.

In this embodiment, after determining that the first virtual machine obtains the target resource information of the virtual device through collection, the virtual device agent 1 may send the target resource information to the second virtual machine, and the virtual device agent 2 receives and stores the target resource information. For example, when the virtual device agent 1 needs to send the target resource information to the second virtual machine, the virtual device agent 1 may assemble the collected target resource information into a data packet, and send the data packet to the virtual device agent 2 using a socket interface. After receiving the data packet, the virtual device agent 2 may store the target resource information in the data packet in a temporary list provided by the virtual device agent 2 and shown in FIG. 4 such that the second virtual machine may access, using a file handle resource recorded in the temporary list, a virtual device resource corresponding to the file handle resource, such as, a virtual disk device or a virtual serial port device. Certainly, in some other possible implementations, the target resource information may also be stored on another valid storage location. A storage manner of a target resource is not limited herein.

S305: In response to an instruction of creating a first virtual device for the second virtual machine, the virtual device agent 2 in the virtual machine monitor searches the target resource information for resource information of the first virtual device, and uses the found resource information as the resource information of the first virtual device.

In this embodiment, the virtual device agent 2 may create the first virtual device for the second virtual machine based on the creation instruction. During specific implementation, after determining that the second virtual machine has received the target resource information of the virtual device of the first virtual machine, the virtual device agent 2 may search the received target resource information for the resource information of the first virtual device in response to the instruction of creating the first virtual device for the second virtual machine, and if the resource information of the first virtual device is found, use the found resource information as the resource information of the first virtual device in the second virtual machine. For example, a file handle of a resource of the first virtual device in the target resource information may be used as a file handle of a resource of the first virtual device in the second virtual machine.

Certainly, in some scenarios, when the virtual device agent 2 responds to an instruction of creating a second virtual device for the second virtual machine and searches the received target resource information for resource information of the second virtual device, if the resource information of the second virtual device is not found, the virtual device agent 2 may create the resource information for the second virtual device in the second virtual machine.

Based on the foregoing process, the virtual device agent 2 may create all virtual devices of the second virtual machine for the second virtual machine such that initialization setting is subsequently performed on the second virtual machine.

S306: The virtual machine monitor suspends the first virtual machine and the second virtual machine.

In an example implementation, the first virtual machine and the second virtual machine may be suspended after initialization setting of the second virtual machine is completed. During specific implementation, the virtual device agent 1 may suspend the first virtual machine, and the virtual device agent 2 may suspend the second virtual machine.

It should be noted that, the virtual machine service on the first virtual machine is interrupted only after the virtualization emulator of the later version is successfully installed, the second virtual machine is configured, and the device is initialized. In this way, interruption time of the virtual machine service can be reduced such that impact of warm upgrade on the virtual machine service can be reduced.

S307: The virtual device agent 1 in the virtual machine monitor sends device status information of the first virtual machine to the second virtual machine.

In some possible implementations, the virtual device agent 1 may send the device status information of the first virtual machine to the second virtual machine using a UNIX socket shared channel, and the virtual device agent 2 on the second virtual machine may receive the device status information.

S308: The virtual device agent 2 in the virtual machine monitor controls the second virtual machine to resume running based on the device status information of the first virtual machine.

In actual application, because the second virtual machine resumes running based on the device status information of the first virtual machine, an interrupted virtual machine service on the first virtual machine may resume running on the second virtual machine. In this case, the first virtual machine does not need to keep in a suspended state, and the first virtual machine may be shut down.

In this embodiment, the second virtual machine may further obtain the target resource information of the virtual device of the first virtual machine in a warm upgrade process. In this way, when creating a virtual device, the second virtual machine may directly use resource information in the target resource information, and does not need to create the resource information, thereby reducing extra resource consumption in the warm upgrade process.

Figure 5:
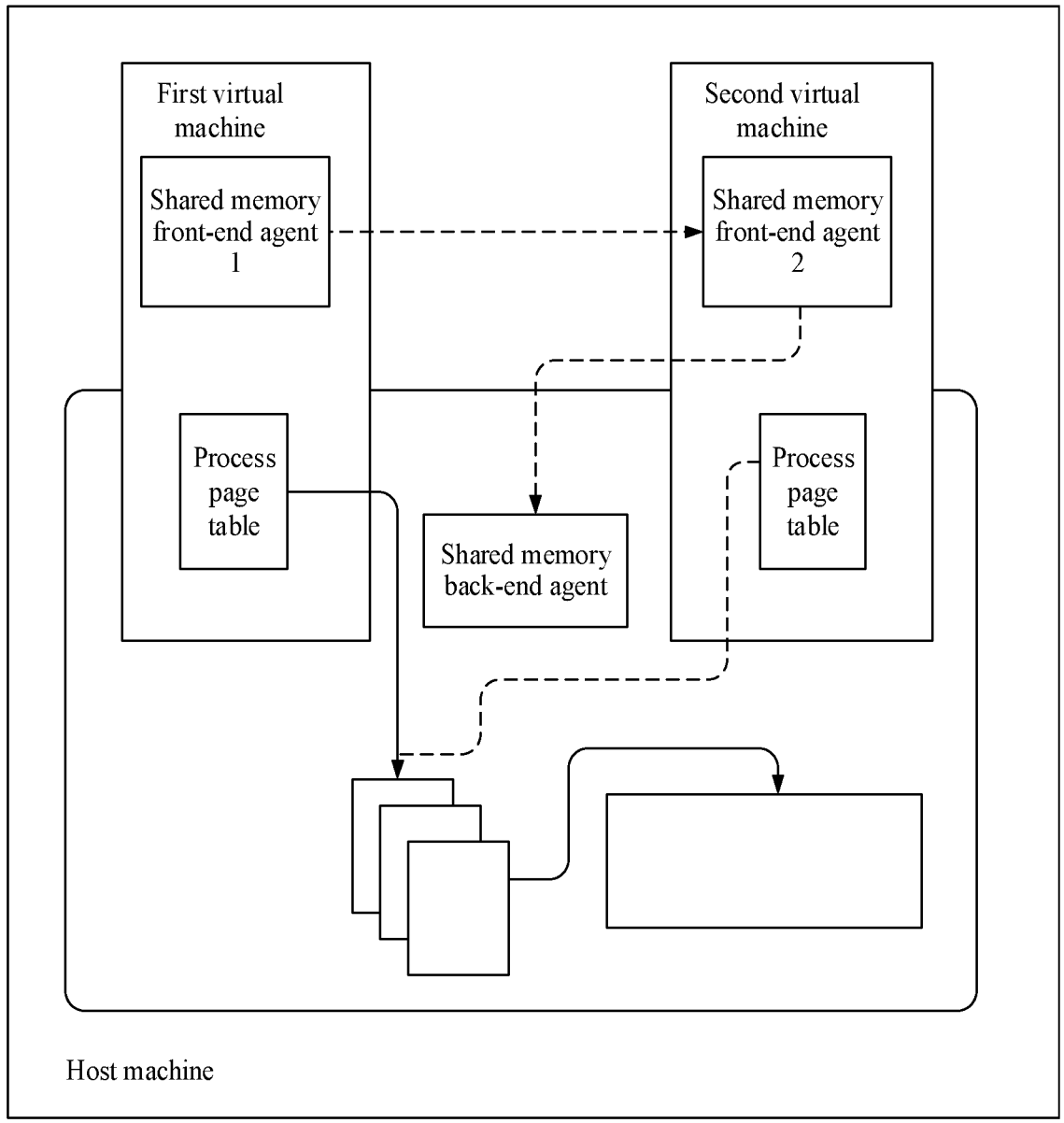
FIG. 5 is an architectural diagram of an example application scenario according to an embodiment of this application.

In an application scenario shown in FIG. 5, when warm upgrade is performed on the virtualization emulator, information about a virtual memory area of the first virtual machine may be further sent to the second virtual machine. In this way, when performing initialization setting, the second virtual machine may not need to additionally apply for a memory for the second virtual machine, but may share a memory resource of the first virtual machine. In this scenario, the virtual machine monitor on the host machine may include a memory sharing (MS) apparatus. The memory sharing apparatus includes an MS front-end (FE) agent and an MS back-end (BE) agent. The MS FE agent may be located in a virtualization emulator component. Further, an MS FE agent 1 may be located in a virtualization emulator component on the first virtual machine, and an MS FE agent 2 may be located in a virtualization emulator component on the second virtual machine. The MS BE agent may be located in a LINUX kernel component of the host machine.

Figure 6A:
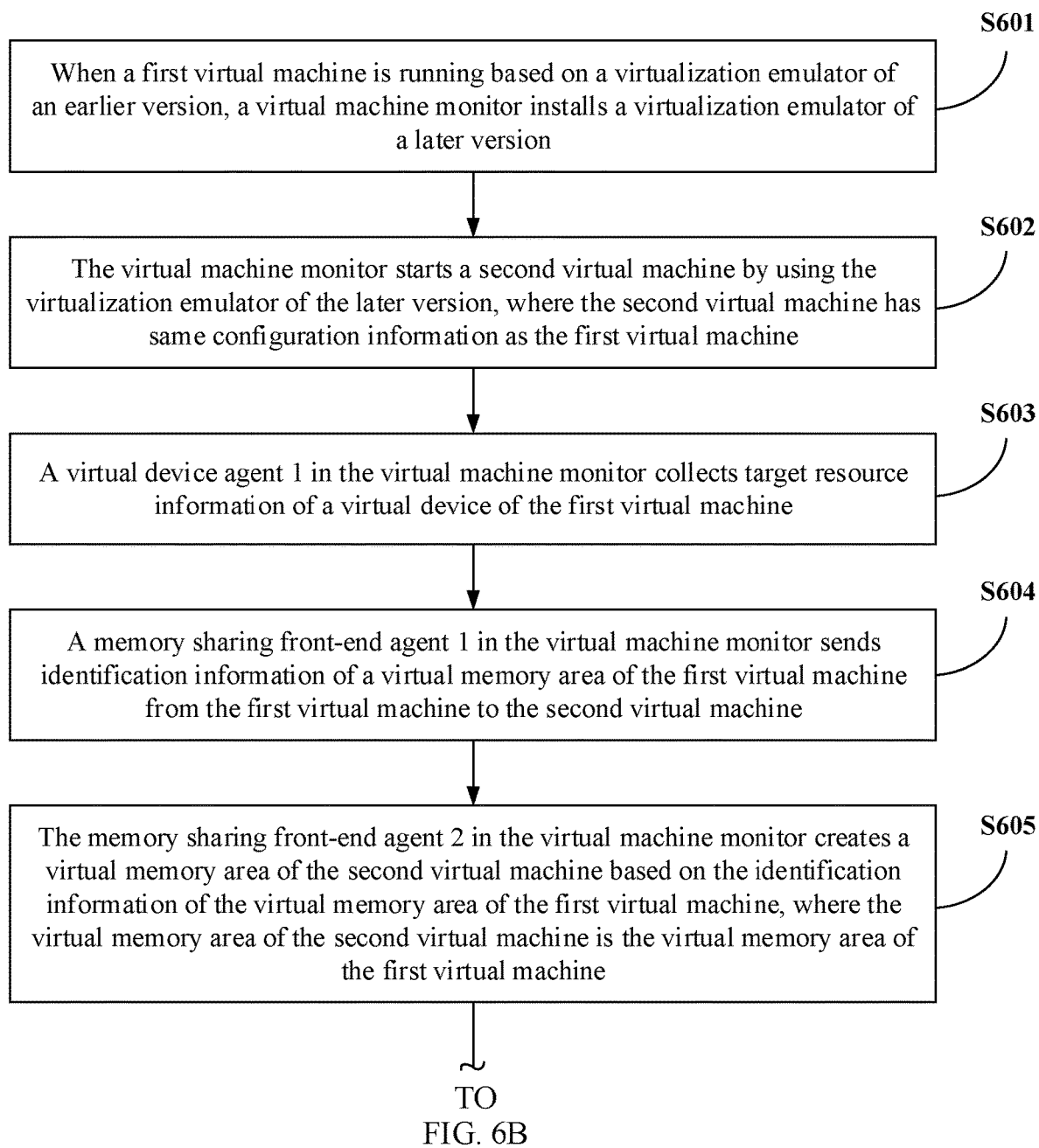

Further, FIG. 6A and FIG. 6B are a schematic flowchart of still another method for upgrading a virtualization emulator according to an embodiment of this application. The method may include the following steps.

S601: When a first virtual machine is running based on a virtualization emulator of an earlier version, a virtual machine monitor installs a virtualization emulator of a later version.

S602: The virtual machine monitor starts a second virtual machine using the virtualization emulator of the later version, where the second virtual machine has same configuration information as the first virtual machine.

S603: The virtual machine monitor suspends the first virtual machine and the second virtual machine.

S604: An MS FE agent 1 in the virtual machine monitor sends identification information of a virtual memory area of the first virtual machine from the first virtual machine to the second virtual machine.

In an example implementation, after determining that initialization setting of the second virtual machine is completed, the MS FE agent 1 may send the identification information of the virtual memory area of the first virtual machine to the second virtual machine such that an MS FE agent 2 receives the identification information of the virtual memory area of the first virtual machine, and the second virtual machine can share the virtual memory area of the first virtual machine. The virtual memory area of the first virtual machine may be applied for from a specified linear area during creation of the first virtual machine.

S605: The MS FE agent 2 in the virtual machine monitor creates a virtual memory area of the second virtual machine based on the identification information of the virtual memory area of the first virtual machine, where the virtual memory area of the second virtual machine is the virtual memory area of the first virtual machine.

During specific implementation, after receiving the identification information of the virtual memory area of the first virtual machine, the MS FE agent 2 may apply to a host machine for creation of a virtual memory area using an map interface of a LINUX system, and use a created virtual memory area as the virtual memory area of the second virtual machine. The virtual memory area of the first virtual machine and the virtual memory area of the second virtual machine are a same virtual memory area. That is, it may be considered that the first virtual machine and the second virtual machine share the same virtual memory area.

For example, the identification information of the virtual memory area may be a start address and a size that are of the virtual memory area. In this way, the virtual memory area of the second virtual machine that is created based on the identification information may have a same start address and a same size as the virtual memory area of the first virtual machine. It should be noted that, when the MS FE agent 2 creates the virtual memory area for the second virtual machine, no page table filling operation is triggered.

S606: An MS BE agent in the virtual machine monitor generates, in response to a request for sharing the virtual memory area between the second virtual machine and the first virtual machine, an entry corresponding to the virtual memory area in a process page table of the second virtual machine using an entry corresponding to the virtual memory area in a process page table of the first virtual machine.

In an example specific implementation, after creating the virtual memory area of the second virtual machine, the MS FE agent 2 may send the request for sharing the virtual memory area of the first virtual machine to the MS BE agent, and the MS BE agent may respond to the request, and determine, based on the identification information of the virtual memory area of the first virtual machine, an entry that needs to be modified in the process page table of the second virtual machine.

It should be noted that the first virtual machine and the second virtual machine are essentially a process in a LINUX system of the host machine. In the LINUX system, each time a new process is created, a memory management module of a LINUX kernel creates a new PGD page table for the process, to record a memory mapping relationship between a logical address and a physical address of the process. Therefore, when the second virtual machine requests to share the virtual memory area of the first virtual machine, the memory management module of the LINUX kernel may adaptively modify an entry in a PGD page table of the second virtual machine, and the entry corresponding to the virtual memory area of the first virtual machine generally does not need to be modified.

For an entry that does not need to be modified in the PGD page table, the MS BE agent may copy an entry that is in a PGD page table of the first virtual machine and that corresponds to the virtual memory area of the first virtual machine to an entry that is in the PGD page table of the second virtual machine and that corresponds to the virtual memory area of the second virtual machine, and increase, by 1, a reference count of a lower-level page table to which the entry corresponding to the virtual memory area in the PGD page table of the second virtual machine points. In this way, when the first virtual machine is shut down, a PUD page table, a PMD page table, and a PT page table in the process page table of the first virtual machine are not released such that a logical address of the second virtual machine may be mapped to a physical address corresponding to the virtual memory area of the first virtual machine, that is, the second virtual machine may access a memory resource in the virtual memory area of the first virtual machine such that the second virtual machine can share the virtual memory area of the first virtual machine.

In addition, the process page table of the first virtual machine is still reserved in a warm upgrade process. In this way, even if the second virtual machine cannot successfully resume running or the warm upgrade fails this time because of another reason, the first virtual machine can still resume running normally such that an interrupted virtual machine service on the first virtual machine may continue to resume running on the first virtual machine.

S607: The MS BE agent establishes reverse mapping information for the virtual memory area of the second virtual machine based on the process page table of the second virtual machine.

In an example specific implementation, the MS BE agent may establish the reverse mapping information for the virtual memory area of the second virtual machine based on the process page table of the second virtual machine using a LINUX kernel reverse mapping interface.

S608: The virtual machine monitor sends device status information of the first virtual machine to the second virtual machine.

S609: The virtual machine monitor controls the second virtual machine to resume running based on the device status information of the first virtual machine.

In this embodiment, the virtual memory area of the first virtual machine may be shared with the second virtual machine within 20 microseconds. In addition, by increasing a reference technology of a related process page table, even if the warm upgrade fails because the second virtual machine cannot successfully resume running or because of another reason, the process page table of the first virtual machine is not released, the first virtual machine can still normally resume running such that the interrupted virtual machine service on the first virtual machine can continue to run.

Figure 7:
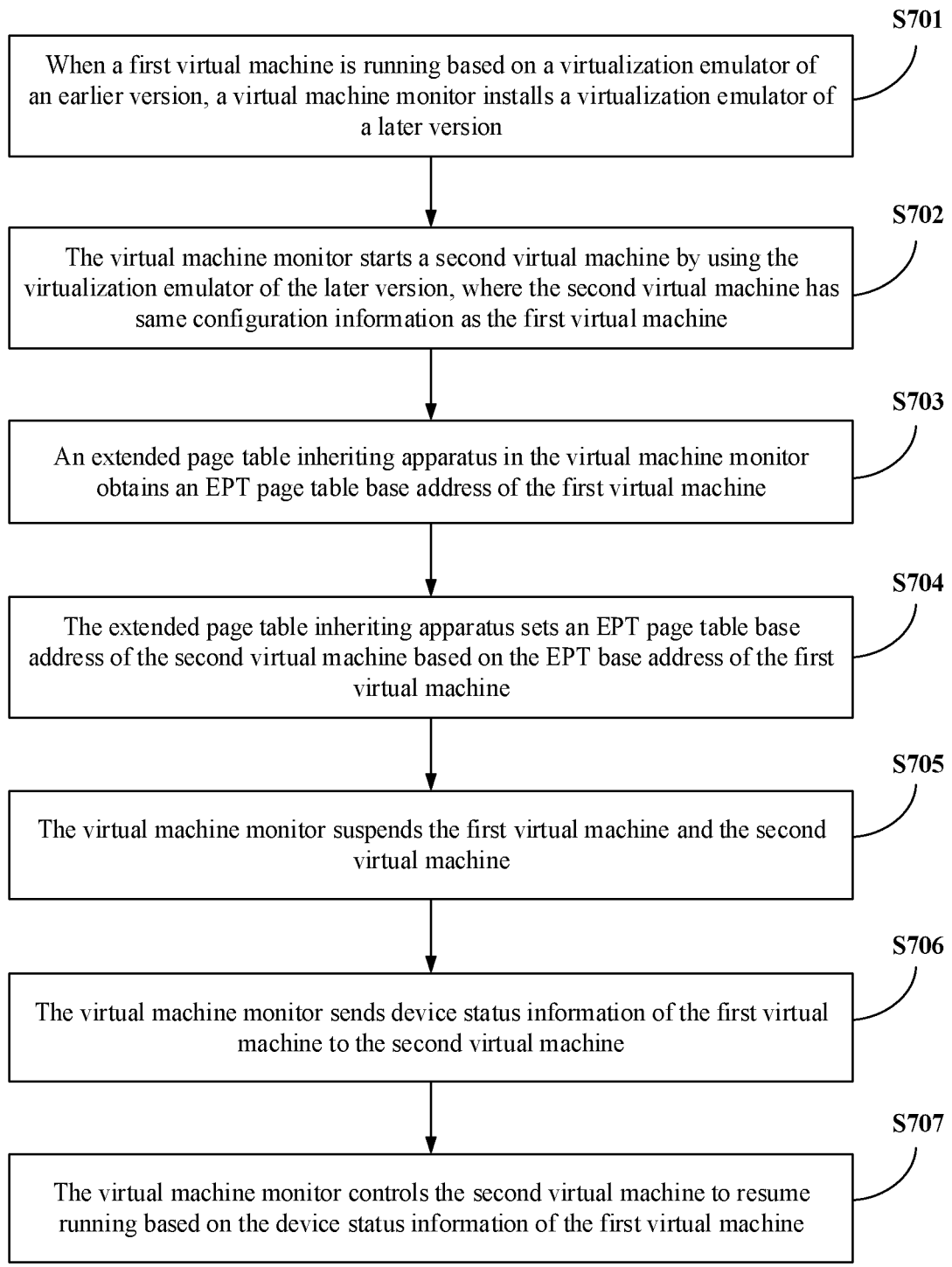
FIG. 7 is a schematic flowchart of yet another method for upgrading a virtual machine emulator according to an embodiment of this application.
Figure 8:
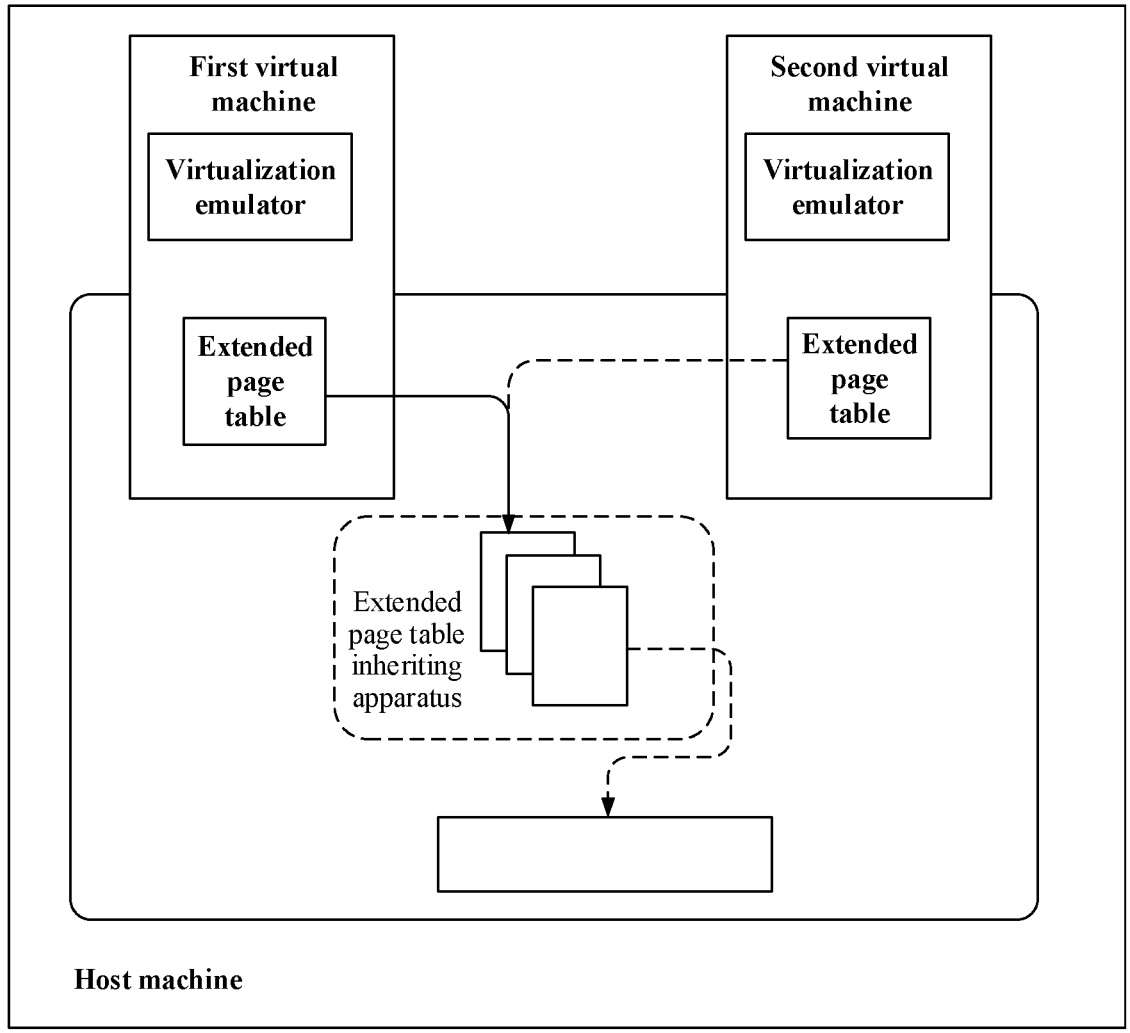
FIG. 8 is an architectural diagram of an example application scenario according to an embodiment of this application.

It should be noted that, in a hardware-assisted virtualization technology, each virtual machine may have another set of page tables in addition to a process page table of the virtual machine, and convert a logical address of the virtual machine into a physical address. This type of page table is referred to as an EPT page table in an inter virtualization technology (VT) technology. In some scenarios, the first virtual machine may share an EPT page table of the first virtual machine with the second virtual machine. Further, FIG. 7 is a schematic flowchart of yet another method for upgrading a virtualization emulator according to an embodiment of this application, and FIG. 8 is an architectural diagram of a scenario in which an EPT page table of a first virtual machine is shared. In this embodiment, the virtual machine monitor may include an EPT inheriting apparatus. The method may include the following steps.

S701: When a first virtual machine is running based on a virtualization emulator of an earlier version, a virtual machine monitor installs a virtualization emulator of a later version.

S702: The virtual machine monitor starts a second virtual machine using the virtualization emulator of the later version, where the second virtual machine has same configuration information as the first virtual machine.

S703. An EPT inheriting apparatus in the virtual machine monitor obtains an EPT page table base address of the first virtual machine.

S704: The EPT inheriting apparatus sets an EPT page table base address of the second virtual machine based on the EPT base address of the first virtual machine.

As shown in FIG. 8, the first virtual machine applies for an EPT page in advance using a buffer pool of the EPT inheriting apparatus, and the buffer pool may manage application or release of an EPT inheriting page. Then, the second virtual machine may obtain the EPT page table base address of the first virtual machine using the EPT apparatus, and set the EPT page table base address of the second virtual machine based on the EPT page table base address, to share the EPT page table of the first virtual machine with the second virtual machine.

S705: The virtual machine monitor suspends the first virtual machine and the second virtual machine.

S706: The virtual machine monitor sends device status information of the first virtual machine to the second virtual machine.

S707: The virtual machine monitor controls the second virtual machine to resume running based on the device status information of the first virtual machine.

In this embodiment, the virtual machine monitor sets the EPT page table base address of the first virtual machine to an EPT page table base address of the virtual machine monitor such that the EPT page table of the first virtual machine can be shared with the second virtual machine. In this way, after warm upgrade is performed on the virtualization emulator, the second virtual machine does not need to recreate an EPT page table such that an EPT violation exception caused by creation of the EPT page table can be avoided, thereby ensuring that memory access performance of the second virtual machine does not deteriorate within a period of time after the warm upgrade, and reducing virtual machine service performance fluctuation caused by the warm upgrade.

Figure 9:
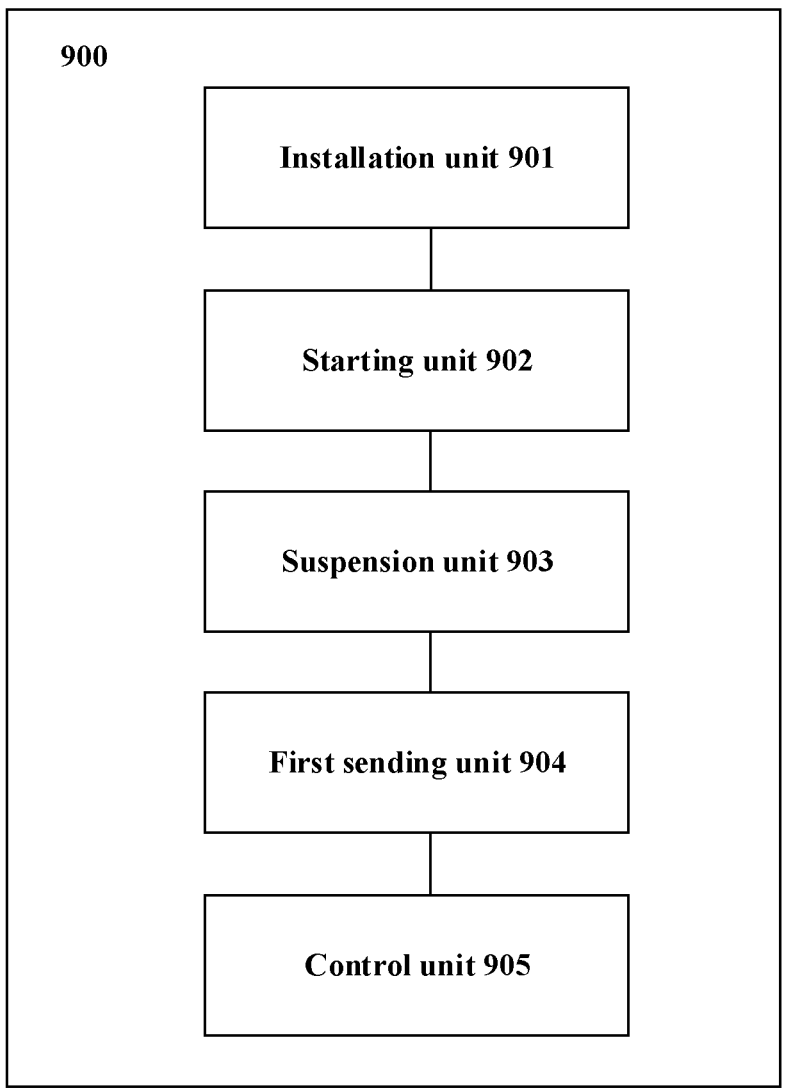
FIG. 9 is a schematic structural diagram of an apparatus for upgrading a virtual machine emulator according to an embodiment of this application.

In addition, embodiments of this application further provide an apparatus for upgrading a virtualization emulator. FIG. 9 is a schematic structural diagram of an apparatus for upgrading a virtualization emulator according to an embodiment of this application. The apparatus 900 includes an installation unit 901 configured to, when a first virtual machine is running based on a virtualization emulator of an earlier version, install a virtualization emulator of a later version, a starting unit 902 configured to start a second virtual machine using the virtualization emulator of the later version, where the second virtual machine has same configuration information as the first virtual machine, a suspension unit 903 configured to suspend the first virtual machine and the second virtual machine, a first sending unit 904 configured to send device status information of the first virtual machine to the second virtual machine, and a control unit 905 configured to control the second virtual machine to resume running based on the device status information.

In a possible implementation, the apparatus 900 further includes a second sending unit configured to send target resource information of a virtual device of the first virtual machine from the first virtual machine to the second virtual machine, and a first searching unit configured to, in response to an instruction of creating a first virtual device for the second virtual machine, search the target resource information for resource information of the first virtual device, and use the found resource information as the resource information of the first virtual device.

In a possible implementation, the apparatus 900 further includes a second searching unit configured to, in response to an instruction of creating a second virtual device for the second virtual machine, search the target resource information for resource information of the second virtual device, and a first creation unit configured to create the resource information for the second virtual device if the resource information cannot be found.

In a possible implementation, the apparatus 900 further includes a second creation unit configured to create a virtual memory area of the second virtual machine based on identification information of a virtual memory area of the first virtual machine, where the virtual memory area of the second virtual machine is the virtual memory area of the first virtual machine.

In a possible implementation, the apparatus 900 further includes a generation unit configured to, in response to a request for sharing a virtual memory area between the second virtual machine and the first virtual machine, generate an entry corresponding to the virtual memory area in a process page table of the second virtual machine using an entry corresponding to the virtual memory area in a process page table of the first virtual machine, and an establishment unit configured to establish reverse mapping information for the virtual memory area of the second virtual machine based on the process page table of the second virtual machine.

In a first possible implementation, the generation unit includes a copying subunit configured to copy an entry corresponding to the virtual memory area in a PGD page table of the first virtual machine to an entry corresponding to the virtual memory area in a PGD page table of the second virtual machine, and a value increasing subunit configured to increase, by 1, a reference count of a lower-level page table to which the entry corresponding to the virtual memory area in the PGD page table of the second virtual machine points.

In a possible implementation, the identification information includes a start address and a size that are of the virtual memory area.

In a possible implementation, the apparatus 900 further includes an obtaining unit configured to obtain an EPT base address of the first virtual machine, and a setting unit configured to set an EPT base address of the second virtual machine based on the EPT base address of the first virtual machine.

In this embodiment, on a basis that the first virtual machine runs based on the virtualization emulator of the earlier version, the second virtual machine running based on the emulator of the later version is created, and the second virtual machine and the first virtual machine have a same configuration and same device status information. In this way, after the second virtual machine successfully runs, an interrupted virtual machine service on the first virtual machine may resume running on the second virtual machine, to upgrade the virtualization emulator. In addition, even if a warm upgrade fails, although the interrupted virtual machine service cannot continue to run on the second virtual machine, an interrupted virtual machine service may resume running on the first virtual machine because the first virtual machine can still resume running based on the virtualization emulator of the earlier version. This means that when the warm upgrade fails, the virtual machine that runs the same virtual machine service may roll back from the virtual machine running based on the virtualization emulator of the later version to the virtual machine running based on the virtualization emulator of the earlier version. This avoids a problem that the virtual machine stops running and the service of the virtual machine is forced to be interrupted and cannot resume running due to an upgrade failure.

The foregoing embodiment describes the apparatus for upgrading a virtualization emulator in the embodiments of this application from a perspective of a functional entity. The following describes in detail the apparatus for upgrading a virtualization emulator in the embodiments of this application from a perspective of hardware processing.

Figure 10:
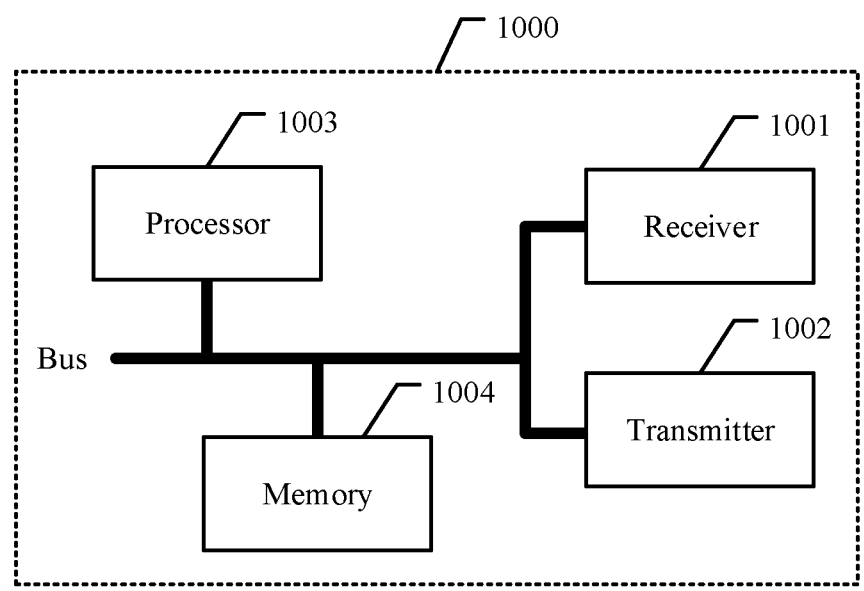
FIG. 10 is a schematic structural diagram of a device for upgrading a virtual machine emulator according to an embodiment of this application.

The following describes a device for upgrading a virtualization emulator provided in the embodiments of this application. Refer to FIG. 10. A device 1000 for upgrading a virtualization emulator includes a receiver 1001, a transmitter 1002, a processor 1003, and a memory 1004 (there may be one or more processors 1003 in the device 1000, and one processor is used as an example in FIG. 10). A communications interface may include the receiver 1001 and the transmitter 1002. In some embodiments of this application, the receiver 1001, the transmitter 1002, the processor 1003, and the memory 1004 may be connected using a bus or in another manner. In FIG. 10, a bus connection is used as an example.

The memory 1004 may include a read-only memory (ROM) and a random-access memory (RAM), and provide an instruction and data to the processor 1003. A part of the memory 1004 may further include a non-volatile RAM (NVRAM). The memory 1004 stores an operating system and an operation instruction, an executable module or a data structure, or a subset thereof, or an extended set thereof. The operation instruction may include various operation instructions in order to implement various operations. The operating system may include various system programs, to implement various basic services and process hardware-based tasks.

The processor 1003 controls operations of the device 1000. The processor 1003 may also be referred to as a central processing unit (CPU). In a specific application, components are coupled together using a bus system. In addition to a data bus, the bus system includes a power bus, a control bus, and a status signal bus. However, for clear description, various types of buses in the figure are marked as the bus system.

The embodiment of this application may be applied to a processor, or implemented by a processor. The processor 1003 may be an integrated circuit chip and has a signal processing capability. In an implementation process, steps in the foregoing methods can be implemented using a hardware integrated logical circuit in the processor 1003, or using instructions in a form of software. The processor 1003 may be a general purpose processor, a digital signal processor (DSP), an application-specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory 1004, and a processor 1003 reads information in the memory 1004 and completes the steps in the foregoing methods in combination with hardware of the processor.

The receiver 1001 may be configured to receive entered digits or character information, and generate signal input related to a related setting and function control of the device 1000. The transmitter 1002 may include a display device such as a display screen, and the transmitter 1002 may be configured to output the digits or the character information through an external interface.

In the embodiments of this application, the processor 1003 is configured to perform the following operations when a first virtual machine is running based on a virtualization emulator of an earlier version, installing a virtualization emulator of a later version, starting a second virtual machine using a virtualization emulator of a later version, where the second virtual machine has same configuration information as the first virtual machine, suspending the first virtual machine and the second virtual machine, sending device status information of the first virtual machine to the second virtual machine, and controlling the second virtual machine to resume running based on the device status information.

In some possible implementations, the processor 1003 is further configured to perform the following operation: sending target resource information of a virtual device of the first virtual machine from the first virtual machine to the second virtual machine, and in response to an instruction of creating a first virtual device for the second virtual machine, searching the target resource information for resource information of the first virtual device, and using the found resource information as the resource information of the first virtual device.

In some possible implementations, the processor 1003 is further configured to perform the following operation: in response to an instruction of creating a second virtual device for the second virtual machine, searching the target resource information for resource information of the second virtual device, and creating the resource information for the second virtual device if the resource information cannot be found.

In some possible implementations, the processor 1003 is further configured to perform the following operation: creating a virtual memory area of the second virtual machine based on identification information of a virtual memory area of the first virtual machine, where the virtual memory area of the second virtual machine is the virtual memory area of the first virtual machine.

In some possible implementations, the processor 1003 is further configured to perform the following operation: in response to a request for sharing a virtual memory area between the second virtual machine and the first virtual machine, generating an entry corresponding to the virtual memory area in a process page table of the second virtual machine using an entry corresponding to the virtual memory area in a process page table of the first virtual machine, and establishing reverse mapping information for the virtual memory area of the second virtual machine based on the process page table of the second virtual machine.

In some possible implementations, the processor 1003 is further configured to perform the following operations: copying an entry corresponding to the virtual memory area in a PGD page table of the first virtual machine to an entry corresponding to the virtual memory area in a PGD page table of the second virtual machine, and increasing, by 1, a reference count of a lower-level page table to which the entry corresponding to the virtual memory area in the PGD page table of the second virtual machine points.

In some possible implementations, the identification information includes a start address and a size that are of the virtual memory area.

In some possible implementations, the processor 1003 is further configured to perform the following operation: obtaining an EPT base address of the first virtual machine, and setting an EPT base address of the second virtual machine based on the EPT base address of the first virtual machine.

In addition, an embodiment of this application provides a computer-readable storage medium. The computer-readable storage medium stores an instruction. When the instruction is run on a computer or a processor, the computer or the processor is enabled to perform the method for upgrading a virtualization emulator.

According to a fourth aspect, an embodiment of this application further provides a computer program product including an instruction. When the computer program product runs on a computer or a processor, the computer or the processor is enabled to perform the method for upgrading a virtualization emulator.

It should be noted that "first" in names such as the "first virtual machine" and the "first virtual device" mentioned in the embodiments of this application is merely used as a name identifier, and does not represent the first in sequence. This rule is also applicable to "second" and the like.

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a ROM/RAM, a magnetic disk, or an optical disc, and includes several instructions for instructing a computer device (which may be a personal computer, a server, or a network communications device such as a router) to perform the methods described in the embodiments or some parts of this application of the present disclosure.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly, for related parts, reference may be made to partial descriptions in the method embodiment. The described apparatus embodiment is merely an example. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The foregoing descriptions are merely example implementations of this application, but are not intended to limit the protection scope of this application.

What is claimed is:

1. A method comprising:
   installing, while a first virtual machine is running based on a first virtualization emulator of an earlier version virtualization emulator, a second virtualization emulator of a later version virtualization emulator;
   starting a second virtual machine using the second virtualization emulator, wherein the second virtual machine comprises the same configuration information as the first virtual machine;
   sending, from the first virtual machine to the second virtual machine, target resource information of a virtual device of the first virtual machine;
   obtaining a first instruction of creating a first virtual device for the second virtual machine;
   searching, in response to the first instruction, the target resource information for first resource information of the first virtual device;
   setting the first resource information as resource information of the first virtual device;
   suspending the first virtual machine after starting the second virtual machine;
   suspending the second virtual machine;
   sending device status information of the first virtual machine to the second virtual machine; and
   controlling the second virtual machine to resume running based on the device status information.

2. The method of claim 1, further comprising:
   obtaining a second instruction of creating a second virtual device for the second virtual machine;
   searching, in response to the second instruction, the target resource information for second resource information of the second virtual device; and
   creating resource information for the second virtual device when the second resource information cannot be found in the target resource information.

3. The method of claim 1, further comprising creating a second virtual memory area of the second virtual machine based on identification information of a first virtual memory area of the first virtual machine, wherein the second virtual memory area is the same as the first virtual memory area.

4. The method of claim 3, further comprising:
obtaining a request for sharing a third virtual memory area between the second virtual machine and the first virtual machine;
generating, in response to the request, a second entry corresponding to the third virtual memory area in a second process page table of the second virtual machine using a first entry corresponding to the third virtual memory area in a first process page table of the first virtual machine; and
establishing reverse mapping information for the third virtual memory area based on the second process page table.

5. The method of claim 4, further comprising:
copying a third entry corresponding to the third virtual memory area in a first page global directory (PGD) page table of the first virtual machine to a fourth entry corresponding to the third virtual memory area in a second PGD page table of the second virtual machine; and
increasing, by one, a reference count of a lower-level page table to which the fourth entry points.

6. The method of claim 3, wherein the identification information comprises a start address and a size of the first virtual memory area.

7. The method of claim 1, further comprising:
obtaining a first Extended Page Table (EPT) base address of the first virtual machine; and
setting a second EPT base address of the second virtual machine based on the first EPT base address.

8. An apparatus for upgrading a virtualization emulator comprising:
a memory configured to store instructions; and
one or more processors coupled to the memory, wherein the instructions cause the one or more processors to be configured to:
install, while a first virtual machine is running based on a first virtualization emulator of an earlier version virtualization emulator, a second virtualization emulator of a later version virtualization emulator;
start a second virtual machine using the second virtualization emulator, wherein the second virtual machine comprises same configuration information as the first virtual machine;
send, from the first virtual machine to the second virtual machine, target resource information of a virtual device of the first virtual machine;
obtain a first instruction of creating a first virtual device for the second virtual machine;
search, in response to the first instruction, the target resource information for first resource information of the first virtual device;
set the first resource information as resource information of the first virtual device;
suspend the first virtual machine after starting the second virtual machine;
suspend the second virtual machine;
send device status information of the first virtual machine to the second virtual machine; and
control the second virtual machine to resume running based on the device status information.

9. The apparatus of claim 8, wherein the instructions further cause the one or more processors to be configured to:
obtain a second instruction of creating a second virtual device for the second virtual machine;
search, in response to the second instruction, the target resource information for second resource information of the second virtual device; and
create the resource information for the second virtual device when the second resource information cannot be found in the target resource information.

10. The apparatus of claim 8, wherein the instructions further cause the one or more processors to be configured to create a second virtual memory area of the second virtual machine based on identification information of a first virtual memory area of the first virtual machine, wherein the second virtual memory area is the same as the first virtual memory area.

11. The apparatus of claim 10, wherein the instructions further cause the one or more processors to be configured to:
obtain a request for sharing a third virtual memory area between the second virtual machine and the first virtual machine;
generate a second entry corresponding to the third virtual memory area in a second process page table of the second virtual machine using a first entry corresponding to the third virtual memory area in a first process page table of the first virtual machine; and
establish reverse mapping information for the third virtual memory area based on the second process page table.

12. The apparatus of claim 11, wherein the instructions further cause the one or more processors to be configured to:
copy a third entry corresponding to the third virtual memory area in a first page global directory (PGD) page table of the first virtual machine to a fourth entry corresponding to the third virtual memory area in a second PGD page table of the second virtual machine; and
increase, by 1, a reference count of a lower-level page table to which the fourth entry points.

13. The apparatus of claim 10, wherein the identification information comprises a start address and a size that are of the first virtual memory area.

14. The apparatus of claim 8, wherein the instructions further cause the one or more processors to be configured to:
obtain a first Extended Page Table (EPT) base address of the first virtual machine; and
set a second EPT base address of the second virtual machine based on the first EPT base address.

15. A computer program product comprising computer-executable instructions stored on a non-transitory computer-readable storage medium, when which when executed by one or more processors, cause an apparatus to:
install, while a first virtual machine is running based on a first virtualization emulator of an earlier version virtualization emulator, a second virtualization emulator of a later version;
start a second virtual machine using the second virtualization emulator, wherein the second virtual machine comprises the same configuration information as the first virtual machine;
send, from the first virtual machine to the second virtual machine, target resource information of a virtual device of the first virtual machine;
obtain a first instruction of creating a first virtual device for the second virtual machine;
search, in response to the first instruction, the target resource information for first resource information of the first virtual device;
set the first resource information from the target resource information as resource information of the first virtual device;

suspend the first virtual machine after starting the second virtual machine;
suspend the second virtual machine;
send device status information of the first virtual machine to the second virtual machine; and
control the second virtual machine to resume running based on the device status information.

16. The computer program product of claim 15, wherein the computer-executable instructions further cause the apparatus to:
obtain a second instruction of creating a second virtual device for the second virtual machine;
search, in response to the second instruction, the target resource information for second resource information of the second virtual device; and
create resource information for the second virtual device when the second resource information cannot be found in the target resource information.

17. The computer program product of claim 15, wherein the computer-executable instructions further cause the apparatus to create a second virtual memory area of the second virtual machine based on identification information of a first virtual memory area of the first virtual machine, and wherein the second virtual memory area is the same as the first virtual memory area.

18. The computer program product of claim 17, wherein the identification information comprises a start address and a size of the first virtual memory area.

19. The computer program product of claim 17, wherein the computer-executable instructions further cause the apparatus to:
obtain a request for sharing a third virtual memory area between the second virtual machine and the first virtual machine;
generate, in response to the request, a second entry corresponding to the third virtual memory area in a second process page table of the second virtual machine using a first entry corresponding to the third virtual memory area in a first process page table of the first virtual machine; and
establish reverse mapping information for the third virtual memory area based on the second process page table.

20. The computer program product of claim 19, wherein the computer-executable instructions further cause the apparatus to:
copy a third entry corresponding to the third virtual memory area in a first page global directory (PGD) page table of the first virtual machine to a fourth entry corresponding to the third virtual memory area in a second PGD page table of the second virtual machine; and
increase, by one, a reference count of a lower-level page table to which the fourth entry points.

* * * * *